3,400,167
HYDROGENATION OF A DEALKYLATED AROMATIC COMPOUND

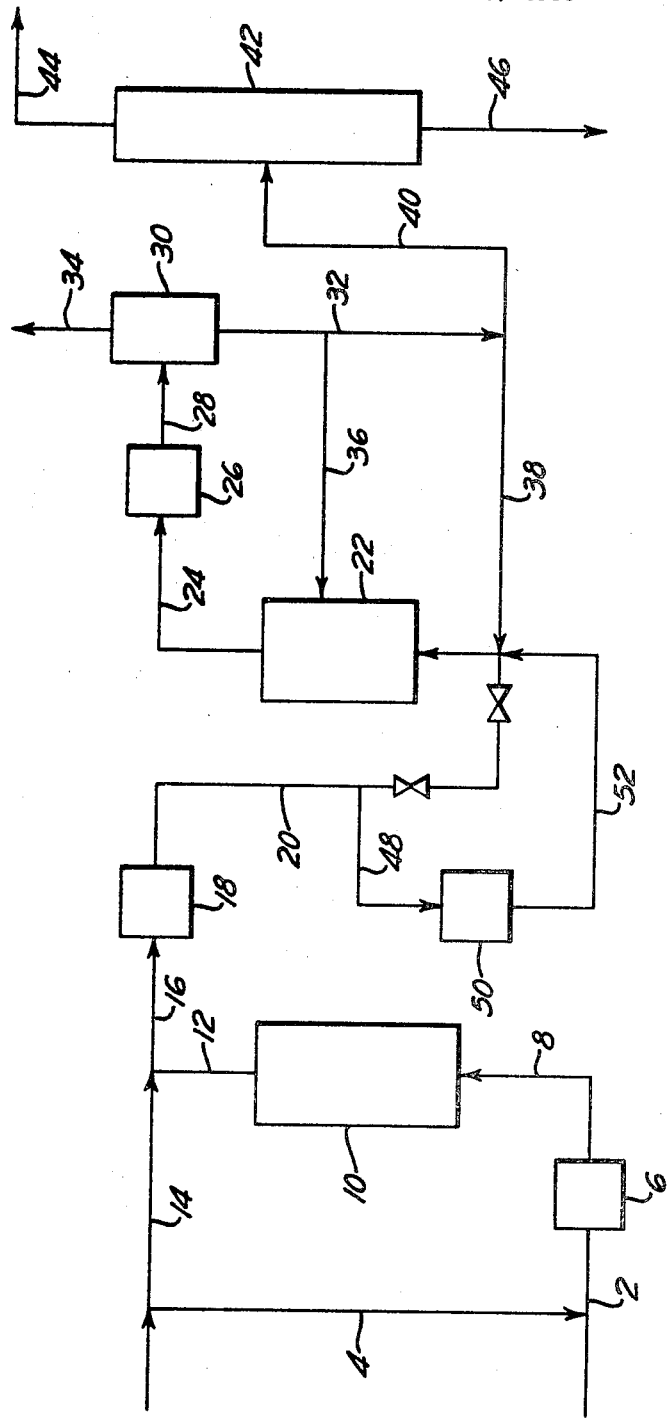

Alfred M. Henke, Springdale, William C. Offutt, Pittsburgh, and Raynor T. Sebulsky, Verona, Pa., assignors to Gulf Research & Development Company, Pittsburgh, Pa., a corporation of Delaware
Filed Feb. 10, 1966, Ser. No. 526,497
2 Claims. (Cl. 260—667)

ABSTRACT OF THE DISCLOSURE

A process for treating the effluent from a hydrodealkylation reactor containing a dealkylated aromatic and sulfur which involves contacting such effluent with a metal capable of being converted to the corresponding metal sulfide, for example, nickel, and thereafter subjecting the resulting effluent to hydrogenation to convert the dealkylated aromatic to the corresponding cycloparaffin, for example, cyclohexane.

---

This invention relates to a process for dealkylating an alkyl aromatic, such as toluene, and thereafter hydrogenating the dealkylated aromatic so obtained, for example, benzene, to the corresponding cycloparaffin, for example, cyclohexane.

The process defined herein can best be illustrated by reference to the accompanying drawing which discloses a preferred embodiment thereof. The fresh alkyl aromatic to be dealkylated is introduced into the system by line 2. Examples of alkyl aromatics which can be employed as charge include toluene, xylene, ethylbenzene, mesitylene, pseudocumene, cumene, isodurene, durene, hexamethylbenzene, etc. Of these, toluene is preferred. Also introduced into the system, by line 4, is hydrogen so that the molar ratio of hydrogen to said alkyl aromatic is from about 1.5:1.0 to about 20:1.0, preferably from about 3.0:1.0 to about 8.0:1.0. The mixture of alkyl aromatic and hydrogen is preheated, for example, by passage through preheater 6, to a temperature of about 1150° to about 1800° F., preferably about 1200° to about 1500° F., and is then passed by line 8 into reactor 10 which is maintained substantially free of catalytic material. As the defined mixture moves through reactor 10 the alkyl aromatic is dealkylated, for example, toluene is converted to benzene and methane is formed. This reaction is exothermic and the temperature of the mixture accordingly rises as it moves through reactor 10. Thus at the inlet end of reactor 10, the temperature of the mixture is about 1150° to about 1800° F., preferably about 1200° to about 1350° F. and the pressure about 100 to about 1,000 pounds per square inch gauge, preferably about 400 to about 600 pounds per square inch gauge, while at the outlet end of reactor 10 the temperature of the mixture is about 1250° to about 1900° F., preferably about 1300° to about 1400° F., and the pressure about 100 to about 1,000 pounds per square inch gauge, preferably about 400 to about 600 pounds per square inch gauge. Calculated on the basis of plug flow through reactor 10, the residence time of the mixture therein is about one to about 400 seconds, preferably about 10 to about 100 seconds.

The dealkylated mixture leaving reactor 10 by means of line 12 is cooled in any suitable manner, preferably by mixture with sufficient cool hydrogen from line 14 so that the resulting mixture in line 16 is at a temperature of about 300° to about 800° F., preferably about 350° to about 450° F., with the pressure being substantially equal to that which existed in reactor 10. If desired, a part of the means required to reduce the temperature of the effluent mixture to the latter temperature level can include an exchanger 18 through which the effluent is passed.

The cooled effluent mixture thus obtained in line 20 is then introduced into hydrogenation reaction zone 22 wherein there is maintained a hydrogenation catalyst suitable to convert the dealkylated aromatic, for example, benzene, to the corresponding cycloparaffin, for example, cyclohexane. As catalyst, any hydrogenation catalyst known in the art for converting an aromatic to the corresponding cycloparaffin can be employed, for example, a hydrogenating metal distended on a refractory support, such as nickel, cobalt, molybdenum, tungsten, platinum, palladium, etc., on silica, alumina, silica-alumina, silica-magnesia, silicon carbide, natural materials, such as clay or kieselguhr, etc., wherein the hydrogenating metal will constitute from about 0.1 to about 90 percent by weight, preferably from about 0.5 to about 70 percent by weight, based on the catalyst and its support. Generally, if platinum, palladium or another noble metal is employed it will constitute about 0.1 to about 2.0 percent by weight based on the catalyst and its support. If nickel, cobalt, molybdenum, tungsten and the like are employed, either alone or in admixture, as the hydrogenating metal, they will usually comprise from about 5.0 to about 90 percent of the weight of the catalyst and support. A preferred hydrogenating metal is one containing from about 10 to about 70 percent by weight of nickel on kieselguhr. The temperature in hydrogenation zone 22 can be from about 100° to about 600° F., preferably from about 150° to about 450° F., the pressure from about 25 to about 1,000 pound per square inch gauge, preferably from about 400 to about 600 pounds per square inch gauge (that is, substantially the same pressure existing at the outlet end of reactor 10) and a liquid hourly space velocity, based on the fresh feed to hydrogenation zone 22, of about 0.5 to about 10, preferably about 1.0 to about 5.0.

The hydrogenated product is removed from hydrogenation zone 22 by line 24 and is cooled by any suitable means, for example, by passing through heat exchanger 26, to a temperature on the order of about 60° to about 500° F., preferably about 80° to about 200° F., and then passed by line 28 to a vapor-liquid separator 30. The crude hydrogenated liquid product is removed from the base of vapor-liquid separator 30 by line 32, while there is removed by overhead line 34 light gases, such as methane and hydrogen. If desired, the hydrogen so removed can be recovered and recycled for use in the process. A portion of the hydrogenated product in line 32 can be recycled by lines 36 and/or 38 to hydrogenation zone 22 to control the temperature therein, which has a tendency to rise due to the exothermicity of the hydrogenation reaction therein. The amount of liquid product in line 32 that can be recycled can amount, for example, from none to over 90 percent by weight thereof. The amount of recycle employed will depend upon how closely it is desired to control the temperature in the hydrogenation zone, and whether or not any external indirect heat exchange is provided, for example, by collecting partially hydrogenated product at one or more points in the hydrogenation zone and cooling it by exchanging heat in a heat exchanger with a cooling medium. In general, it is desirable to maintain temperatures in the hydrogenation zone below about 500° F., preferably below about 450° F., in order to minimize side reactions and to obtain substantially complete hydrogenation. This will usually be accomplished by direct heat transfer with recycled product or by indirect heat exchange with a cooling medium, or by a combination of the two techniques. The remainder of the hydrogenated product in line 40 is introduced into distillation column 42, wherein under suitable conditions, for example, a temperature on the order of about 175° to about 215° F. and about atmospheric pressure, the purified cycloparaffin, for example, cyclohexane, is removed overhead by line 44 and heavier products by line 46.

In some cases, wherein sulfur is introduced into the system, a modification of the above procedure is extremely desirable. Thus, in some instances, sulfur can be introduced as an impurity in the alkyl aromatic feed or along with the hydrogen. In other instances, sulfur is added, for example, as a mercaptan, to the feed to inhibit coking reactions in reactor 10. Under the conditions existing in reactor 10, the sulfur so introduced is converted to $H_2S$ gas. The amount of sulfur in the effluent stream from reactor will, in such instance, contain from about five to about 500 parts per million of sulfur. Since $H_2S$ is detrimental to the hydrogenation catalyst in hydrogenation reactor 22 and would have a tendency to inhibit its desired activity, its removal from the system is required prior to the hydrogenation zone. The obvious way to remove $H_2S$ from the product effluent from reactor 10 would be to reduce the temperature and pressure of such product effluent to the extent that the desired dealkylated aromatic and heavier products formed would be in the liquid state. Lighter products associated therewith, for example, hydrogen, methane and $H_2S$ would be gaseous. When the $H_2S$ is separated from this mixture, methane and hydrogen would also be separated. In order to hydrogenate the dealkylated aromatic recovered in such case, for example, benzene, the latter would have to be repressured to hydrogenation pressure, the temperature raised to hydrogenation temperature and sufficient hydrogen added thereto to hydrogenate said dealkylated aromatic.

We have found that the above is not necessary, that it is not required to lower the pressure and temperature of the effluent from reactor 10, to use a stripper thereafter to remove $H_2S$ therefrom, as well as hydrogen, and to bring the resulting product, along with added hydrogen, to hydrogenation conditions in order to avoid poisoning the hydrogenation catalyst in hydrogenation zone 22. The above can be avoided by not passing the cooled product in line 20 directly to hydrogenation reaction zone 22 but, instead, by line 48 to adsorber 50 which contains a metal capable of being converted to a sulfide by reaction with $H_2S$ and which is capable of being reduced back to the metal with hydrogen. The metal can be used alone or, preferably, it can be distended on a support. Examples of metals which can be used are nickel, cobalt, iron, molybdenum, tungsten and mixtures of the same. Of these, nickel, cobalt and iron are preferred, nickel being the most preferred. Supports for such metals can include alumina, silica, silicia-alumina, silicia-magnesia, silicon carbide, including natural materials such as clay or kieselguhr. The metal will constitute from about two to about 70 percent by weight of the total adsorbent when a base is employed. The adsorption temperature in adsorber 50 can be from about 100° to about 600° F., preferably about 350° to about 450° F., the pressure from about atmospheric to about 1,000 pounds per square inch gauge, preferably about 400 to about 600 pounds per square inch gauge (approximately similar to that near the outlet of reactor 10). Even lower adsorption temperatures can be employed, if desired, but would not be advantageous in the present instance because their use would require reheating of the desulfurized thermal hydrodealkylation effluent to an appropriate temperature to charge to the hydrogenation reactor. The gaseous mixture is passed through adsorber 50 at a rate of about 10 to about 500 cubic feet per hour per pound of metal available therein, preferably about 50 to about 200 cubic feet per hour per pound of metal available therein. When the metal therein has been deactivated by conversion thereof to the corresponding metal sulfide, the latter can be reduced, by any appropriate method, to the original metal, or the deactivated metal sulfide can be discarded and fresh metal can be introduced into adsorber 50. Because of the presence of $H_2S$ in adsorber 50, little or no hydrogenation of the dealkylated aromatic occurs therein. The effluent from adsorber 50 in line 52, containing from about 0.1 to about 2 parts per million by weight of sulfur, is then introduced into hydrogenation zone 22, wherein the sequence of procedural steps as outlined above are employed.

The above can be illustrated by reference to the following wherein sulfur is also in the system. It is to be understood that with no sulfur in the system, the process would be carried out in similar fashion but without the step required to remove the same. Fresh toluene in line 2 is pumped into the system at the rate of 100 gallons per hour to a system pressure of 550 pounds per square inch gauge and mixed with 15,500 standard cubic feet per hour of reformer off-gas, which has been compressed to the same pressure, from line 4. The pressure throughout the procedure remains at about 550 pounds per square inch gauge, with allowance for the small losses in head caused by friction. No further compression or recompression of the process streams is employed. Standard conditions are then taken to be 60° F. and one atmosphere. The reformer off-gas analyzes 87 mol percent hydrogen, 7.0 mol percent methane, 3.7 mole percent ethane, 2.3 mol percent propane and contains 250 parts per million $H_2S$. This quantity of reformer off-gas contain 35.5 mols of hydrogen feed per hour and the resulting hydrogen to toluene mol ratio of the mixture is 4.5 to 1.0. The mixture of toluene and hydrogen-containing gas is preheated at 1220° F. by passage through preheater 6 and is then introduced in thermal hydrodealkylation reactor 10 by line 8. The soaking time in the reactor is 54 seconds calculated on the basis of plug flow of the reactants. Due to the exothermic nature of the hydrodealkylation reaction, the temperature rises from 1220° F. at the inlet to 1350° F. at the outlet. In the reactor 98 percent of the toluene is converted with a selectivity of 93.4 percent to benzene. The effluent composition comprises 45.6 mole percent hydrogen, 39.0 mol percent methane, 14.6 mol percent benzene, 0.34 mole percent toluene and and 0.46 mol percent diphenyl and other heavy aromatics as well as 33 parts per milion of $H_2S$ based on the total effluent weight. The effluent from reactor 10 is immediately quenched to 1096° F. with 9660 standard cubic feet per hour of additional reformer gas from line 14, and is further cooled by heat exchange in exchanger 18 to 400° F. Because of the added reformer off-gas used as quench, the stream in line 20 contains a total of 74 parts per million $H_2S$ based on the total weight thereof.

The total stream in line 20 is passed by line 48 to adsorber 50 containing 0.3 cubic feet of a commercial nickel catalyst supported of alumina (Harshaw Ni-0304T). This catalyst contains 25 percent nickel supported on alumina. Before start-up, the catalyst in adsorber 48 was reduced at 600° F. with hydrogen and then mildly sulfided at 600° F. and atmospheric pressure, with a mixture of hydrogen and $H_2S$ containing 0.1 percent by volume $H_2S$ for two hours. This is sufficient to poison the activity of the catalyst for hydrogenation of benzene, while retaining most of the nickel in the reduced metallic state. $H_2S$ is removed from the process stream in adsorber 50 by reacting with the metallic nickel to form $Ni_3S_2$. At a temperature of 400° F. and over a 24-hour period, 65 percent of the nickel is converted to the sulfide. The effluent stream in 52 contains 0.5 part per million of $H_2S$.

The effluent stream from adsorber 50, which contains primarily benzene, hydrogen and methane, is mixed with recycle unpurified cyclohexane from line 38 prior to entering hydrogenation reactor 22. In this operation, 82.6 gallons per hour of crude benzene is diluted with 100 gallons of recycled cyclohexane and its temperature is thereby lowered to 240° F. Hydrogenation zone 22 contains 330 pounds of a commercial hydrogenation catalyst (Harshaw Ni–0104T) consisting of 58 percent nickel supported by kieselguhr. The liquid hourly space velocity of the charge through the hydrogenation zone is three volumes of feed per volume of catalyst per hour. An additional 600 gallons per hour of crude cyclohexane product is recycled by line 36 into hydrogenation zone 22 to help control the temperature therein.

The product leaving hydrogenation zone 22 is at a temperature of 359° F. and is substantially completely hydrogenated. This product is passed through exchanger 26 and is thereby cooled to a temperature of 80° F. and then led to vapor-liquid separator 30 by line 28. From the bottom of the separator, there is withdrawn 793 gallons per hour of crude cyclohexane product, of which 700 gallons are recycled by lines 36 and 38 as pointed out above. The remainder of the crude product is passed by line 40 to distillation column 42. From the overhead of the distillation column, 86.1 gallons per hour of cyclohexane of 99.5 percent purity are withdrawn through line 44, while 6.9 gallons per hour of a bottoms product comprising five percent by volume cyclohexane, 30 percent by volume methylcyclohexane and 64 percent by volume of heavier cycloparaffins is withdrawin by line 46. The distillation column is operated at approximately atmospheric pressure and a temperature of 177° C. measured at the top of the column. From the top of vapor-liquid separator 30, 17,330 standard cubic feet per hour of gas is withdrawn through line 34, the composition of which is 48.5 mol percent hydrogen,, 46.1 mol percent methane, 3.3 mol percent ethane and 2.1 mol percent propane. If desired, this gas can be used to regenerate the catalyst in adsorber 50. In such case, the gas is heated to a temperature of 850° F. In a typical situation about 24 hours is required to reduce the $Ni_3S_2$ substantially completely to metallic nickel.

The advantages of operating in accordance with the procedures defined herein are many. Since the thermal hydrodealkylation unit and the hydrogenation unit are operated at about the same pressure, the total effluent from the thermal hydrodealkylation unit can be introduced directly into the hydrogenation unit. The only requirement is that the effluent be cooled to hydrogenation temperature. It was most unusual to find that the total effluent from the thermal hydrodealkylation unit can be introduced directly into the hydrogenation unit. Taking toluene as representative of the alkyl aromatic charge employed herein, in the thermal hydrodealkylation unit not only are benzene and methane formed but additionally appreciable amounts of heavier products, including diphenyl, alkyl diphenyls, fluorene and polyphenyls are also formed. Since the latter are heavy aromatics, it would have been expected that they would tend to deactivate the hydrogenation catalyst quickly. This is so because such compounds would be strongly adsorbed on the catalyst and thus would tend to remain in the hydrogenation zone for a longer period of time than the other compenents introduced therein. At the elevated temperatures employed in the hydrogenation reactor, it would appear likely that such heavy compounds would decompose to form coke which would then deposit on the hydrogenation catalyst to deactivate the same. Unexpectedly, we have found that the hydrogenation catalyst is not rapidly deactivated and that good results can be obtained by passing the total effluent from the thermal hydrodealkylation unit directly into the hydrogenation unit for purposes of converting the dealkylated aromatic to the corresponding cycloparaffin.

In this respect a sample of the heavier products from thermal hydrodealkylation was obtained by distilling the condensed liquid product from a thermal hydrodealkylation unit. The thermal hydrodealkylation unit employed was operated at a temperature of about 1300° F., and a pressure of 460 pounds per square inch gauge. The feed to the thermal dehydrogenation unit was a mixture of hydrogen and toluene in a molar ratio of 4:1. The major product of the dealkylation was, of course, benzene. The heavy products, recovered as the bottoms product of the distillation after benzene and unreacted toluene had been distilled over, consisted largely of diphenyl, methyl diphenyls, fluorene and polyphenyls. A mixture containing equal amounts of benzene and these bottoms was prepared. This amount of heavy products is about ten times the amount which would normally be present in the effluent from thermal hydrodealkylation of toluene. First, this mixture was desulfurized at room temperature by passing it over a nickel catalyst. The catalyst employed was Ni–010T, a commercial catalyst available from Harshaw Chemical Company, which contains 44 percent nickel dispersed on kieselguhr. Then the mixture was hydrogenated over another sample of the same catalyst at a temperature of 200° to 400° F., 500 pounds per square inch gauge and a liquid hourly space velocity of 1.0 to 3.0. Approximately 97.5 percent saturation of the blend was obtained and no loss of hydrogenation activity was noted during the 25 volumes throughput run. This is equivalent to about 250 volumes throughput of typical thermal hydrodealkylation effluent on the basis of the distillation bottoms present.

When the present process is operated in a manner to remove sulfur from the effluent of the thermal hydrodealkylation reaction, even greater advantages result therefrom. As above, unexpectedly the heavy aromatic bottoms do not appear to affect adversely the activity of the catalyst in absorber 50. Since $H_2S$ and the remainder of the product from the thermal hydrodealkylation reactor is gaseous, the use of adsorber for removal of $H_2S$ therefrom is ingenious. The only other feasible method available would be costly and time consuming. Thus, the thermal hydrodealkylation reactor effluent would have to be subjected to a reduction in temperature and pressure to the extent that the desired dealkylated aromatic and heavier products formed would be in the liquid state. Lighter products associated therewith, for example, hydrogen, methane and $H_2S$, would be gaseous. When the $H_2S$ is separated from this mixture, methane and hydrogen would also be separated. In order thereafter to hydrogenate the dealkylated aromatic recovered in such case, for example, benzene, the latter would have to be repressured to hydrogenation pressure, the temperature raised to hydrogenation temperature and sufficient hydrogen added thereto to hydrogenate said dealkylated aromatic. By employing an adsorber, as defined, we obtain excellent results in the removal of sulfur compounds from the thermal hydrodealkylation reactor effluent, without the need to go through the above involved sulfur-removal procedure.

Obviously, many modifications and variations of the invention as hereinabove set forth can be made without departing from the spirit and scope thereof and therefore only such limitations should be imposed as are indicated in the appended claims.

We claim:

1. A process for converting an alkylaromatic to the corresponding cycloparaffin which comprises subjecting said alkylaromatic in the presence of sulfur in a hydrodealkylation zone to hydrodealkylation conditions, including temperatures of about 1150° to about 1900° F. and pressures of about 100 to about 1000 pounds per square inch gauge to obtain a dealkylated product containing dealkylated aromatic and from about five to about 500 parts per million of sulfur, passing the entire dealkylated product directly to an adsorption zone maintained at about the same pressure as that existing in said hydrodealkylation zone and a temperature of about 100° to about 600° F. and containing at least one metal selected from the group consting of nickel, cobalt, iron, molybdenum and tungsten, whereby a metal sulfide corresponding to said metal is obtained, and thereafter passing the resulting effluent substantially free of sulfur from said adsorption zone directly to a hydrogenation zone maintained at about the same pressure as that existing in said adsorption zone and a temperature of about 100° to about 600° F. and containing a hydrogenation catalyst and hydrogen wherein said dealkylated aromatic is converted to the corresponding cycloparaffin.

2. The process of claim 1 wherein the alkylaromatic being treated is toluene, the metal in the adsorption zone is nickel and the hydrogenation catalyst in the hydrogenation zone is nickel.

References Cited

UNITED STATES PATENTS

| | | | |
|---|---|---|---|
| 3,213,150 | 10/1965 | Cabbage | 260—667 |
| 3,213,151 | 10/1965 | Sherk | 260—667 |
| 3,284,522 | 11/1966 | Logwinuk et al. | 260—667 |

DELBERT E. GANTZ, *Primary Examiner.*

V. O'KEEFE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,167            September 3, 1968

Alfred M. Henke et al.

It is certified that error appears in the above identified patent and that said Letters Patent are hereby corrected as shown below:

Column 4, line 37, "at" should read -- to --; line 49, "milion" should read -- million --. Column 5, line 31, "177° C." should read -- 177° F. --; line 62, "compenents" should read -- components --. Column 6, line 17, "Ni-010T" should read -- Ni-0101T --; line 35, "absorber" should read -- adsorber --.

Signed and sealed this 3rd day of February 1970.

(SEAL)
Attest:

Edward M. Fletcher, Jr.
Attesting Officer

WILLIAM E. SCHUYLER, JR.
Commissioner of Patents